United States Patent [19]

Jin et al.

[11] 4,093,788

[45] June 6, 1978

[54] METHOD FOR THE PREPARATION OF POLYVINYL CHLORIDE BY SUSPENSION OR EMULSION POLYMERIZATION

[75] Inventors: Jung Il Jin, Irvington, N.Y.; Arthur J. Yu, Stamford, Conn.

[73] Assignee: Stauffer Chemical Company, Westport, Conn.

[21] Appl. No.: 482,176

[22] Filed: Jun. 24, 1974

[51] Int. Cl.$^2$ ............................ C08F 2/24; C08F 2/18
[52] U.S. Cl. ...................................... 526/74; 526/200; 526/208; 526/344
[58] Field of Search ................. 260/87.1, 92.8 W; 526/74, 208, 344

[56] References Cited

U.S. PATENT DOCUMENTS

| | | | |
|---|---|---|---|
| 3,004,009 | 10/1961 | Dell | 260/86.3 |
| 3,669,946 | 6/1972 | Koyanagi | 260/87.5 R |

*Primary Examiner*—Christopher A. Henderson, Jr.
*Attorney, Agent, or Firm*—Richard P. Fennelly

[57] ABSTRACT

The use of an anthraquinone sulfonate as an additive in an aqueous suspension or emulsion medium containing a vinyl chloride monomer substantially reduces the formation of polymer scale which is normally deposited on the inner walls of the polymerization vessel after a suspension or emulsion polymerization has been conducted.

10 Claims, No Drawings

METHOD FOR THE PREPARATION OF POLYVINYL CHLORIDE BY SUSPENSION OR EMULSION POLYMERIZATION

TECHNICAL DESCRIPTION OF THE INVENTION

During the suspension and emulsion polymerization of vinyl chloride monomer polymer scale often becomes deposited on the inner walls of the polymerization vessel. This reduces the polymer yield and the cooling capacity of the vessel. It also permits the scales coming off the wall to mix with the product thereby deteriorating the physical properties of the product. This polymer scale must therefore be removed at regular intervals by such methods as solvent cleaning thereby precluding a continuous and therefore more economical use of the polymerization vessel.

Some recent attempts to produce a clean PVC process are discussed in the U.S. patent literature. One approach is mentioned in U.S. Pat. No. 3,699,946 and comprises the coating of the reactor wall prior to polymerization with at least 0.01 gm/m$^2$ of any one of a number of compounds including polar oxygen-containing organic compounds such as quinones, e.g. parabenzoquinone, and anthraquinone dyes. When anthraquinone dyes are used the color of the resulting PVC product will of necessity be colored to some degree. This is unacceptable in some applications. The use of quinones, such as parabenzoquinone, gives inferior results to those obtained by using an anthraquinone dye. Hence it is an object of this invention to give a clean suspension or emulsion PVC process with use of an additive which will give good results but which will not impart a color to the PVC resin.

The present invention comprises the addition of from about 0.0005 to 0.01% by weight based upon the weight of the entire suspension or emulsion batch charge, preferably about 0.001 to 0.002% by weight, to the suspension or emulsion batch charge of a salt of an anthraquinone sulfonic acid selected from the group consisting of the sodium, potassium, and ammonium salts of 1-anthraquinone sulfonic acid, 2-anthraquinone sulfonic acid, and 2,6-anthraquinone disulfonic acid. The preferred salt is the sodium salt, and the preferred compound is sodium 2-anthraquinone sulfonate. These compounds are colorless anthraquinone dye intermediates and are readily available commercially. The sulfonate is added to the suspension of emulsion batch charge with the other ingredients which are normally incorporated therein.

The basic aqueous suspension batch charge which can be used herein when suspension polymerization is selected is well known to persons of ordinary skill in the art. It comprises as one main ingredient a vinyl chloride monomer charge. Applicable vinyl chloride monomers include vinyl chloride itself or vinyl chloride together with a minor proportion, e.g., up to about 25%, by weight, of one or more of such vinyl monomers as the alpha-olefins such as ethylene, propylene and butylene; vinyl esters of carboxylic acids such as vinyl acetate, vinyl benzoate, vinyl butyrate, and vinyl stearate; vinylidene halides such as vinylidene chloride; the $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro- substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl aryl compounds such as styrene and alphamethyl styrene; nitriles of ethylenically unsaturated carboxylic acids such as acrylonitrile and methacrylonitrile; vinyl pyrrolidones such as N-vinyl-2-pyrrolidone; $C_1$–$C_{20}$ alkyl vinyl ethers such as methyl vinyl ether, ethyl vinyl ether and stearyl vinyl ether; dienes such as isoprene and butadiene; and, any other vinyl monomers copolymerizable with vinyl chloride. From this group, the use of vinyl esters such as vinyl acetate is preferred for selection as constituting a minor proportion of the vinyl chloride-containing charge. The term "vinyl chloride monomer" as used herein is meant to include the use of vinyl chloride monomer alone as well as in combination with the aforesaid monomers which copolymerize well with vinyl chloride monomer.

Also included in the suspension batch charge is from about 0.05 to 5%, based on the total weight of vinyl chloride monomer, of a suspending agent such as, for example, methyl cellulose, hydroxyethyl cellulose, hydroxypropyl methyl cellulose, gelatine and the like. Preferred for this purpose is hydroxypropyl methyl cellulose which should, preferably, have a viscosity of at least 3,000 cps, and, preferably, about 15,000 cps. as determined, at 20° C., with a 2%, by weight, aqueous solution of the polymer in a Ubbelohde viscometer according to ASTM Procedures D-1347-64 and D-2363-65T.

In addition, a monomer-soluble catalyst or initiator such, for example, as azobisisobutyronitrile, lauroyl peroxide, benzoyl peroxide or isopropylperoxy dicarbonate, is present in the suspension batch charge in a concentration of from about 0.01 to 1.0%, by weight, of the vinyl chloride monomer. If desired a buffer or basic substance can be added to keep the pH at a level within the range of from about 7–9. This further aids the anthraquinone sulfonate used in the present process in its action of giving a clean PVC reactor. Examples of substances which can be added are sodium carbonate, bicarbonate, or hydroxide or an alkali metal borate.

Polymerization is initiated by heating the above-described recipe at a temperature in the range of from about 35° to 75° C., preferably about 50°–75° C. for a period of from about 2 to 12 hours with agitation being applied throughout the course of the reaction. When the reaction has been completed, the inner walls of the reactor are clean.

The type of emulsion batch which can be used with the present invention is also well known to persons of ordinary skill in the art. Typical processes are described in U.S. Pat. No. 3,546,154 to Jesse C. H. Hwa et al and in U.S. Pat. No. 3,562,359 to Sheldon Gelman. The vinyl chloride containing monomers that are used are as set forth above for suspension polymerization. The initiator is preferably a water-soluble peroxide or persulfate such as the alkali metal persulfates, e.g., potassium, sodium and lithium persulfates, ammonium persulfate, morpholine persulfate, the perborates, the peracetates, urea peroxides, hydrogen peroxide, tertiary butyl hydroperoxide, ethylene diamine persulfate and alkanolamine persulfates. Redox catalysts as well as oil soluble initiators, e.g. benzoyl and lauroyl peroxides, can also be used. The catalyst is generally present at about 0.01 to to 1% by weight of the monomers. The emulsifying agent is any that would be known to a person of ordinary skill in the art, including sodium lauryl sulfate, potassium stearate, alkyl benzene sulfonate, ammonium dialkyl sulfosuccinate and the like. The emulsifying agent is generally present in amounts ranging from about 0.2 to 2% by weight of the monomer. The polymerization is carried out at about 35° – 70° C, preferably about 40°–55° C, using an autoclave at autogenous pressure. If desired an alkaline buffer can be added to reduce corrosion in the autoclave.

The present invention is exemplified by the following Examples:

EXAMPLE 1

The following aqueous suspension batch was formulated and charged into a 2 gallon reactor:

| REAGENT | AMOUNT (g) |
| --- | --- |
| Vinyl Chloride Monomer | 2871 |
| Water | 4225 |
| Azo bisisobutyronitrile | 2.1 |
| Methocel (1% solution)-Hydroxypropyl methyl cellulose | 275 |
| 2-Anthraquinone sulfonic acid sodium salt | 0.1 |

The temperature was set at 73° C. and the pressure at 169–172 psi. After about 4½ hours the run was stopped. The pH of the effluent was about 4.5, and the inner surfaces of the reactor showed very little polymer scale.

EXAMPLE 2

Another suspension batch charge was formulated and was placed in the unwashed reactor used in Example 1:

| REAGENT | AMOUNT (g) |
| --- | --- |
| Vinyl chloride monomer | 3090 |
| Water | 4225 |
| Azo-bisisobutyronitrile | 2.1 |
| Methocel (1% solution) | 275.0 |
| 2-Anthraquinone sulfonic acid sodium salt | 0.1 |

The run was conducted at 73° C. and 133–172 psi for about 3 hours. Three grams of butylated hydroxytoluene in 15g of toluene was then added. The reactor showed a light additional buildup of polymer scale.

EXAMPLE 3

Another suspension batch charge was formulated and was placed in the unwashed reactor used in Example 2:

| Reagent | Amount (g) |
| --- | --- |
| Vinyl chloride monomer | 3045 |
| Water | 4225 |
| Azo bisisbutyronitrile | 2.1 |
| Methocel (1% solution) | 275 |
| 2-Anthraquinone sulfonic acid sodium salt | 0.1 |

The reaction was run at 72.5–73° C. and 167–170 psi for about 6 hours. A small amount of additional polymer scale was noted since the previous run. The reactor after these three runs exhibited less polymer buildup than would be noted for a reactor which did not contain the 2-anthraquinone sulfonic acid sodium salt.

EXAMPLE 4

The following suspension batch was formulated and was charged into the unwashed reactor from Example 3:

| Reagent | Amount (g) |
| --- | --- |
| Vinyl Chloride monomer | 3070 |
| Water | 4225 |
| Azo bisisobutyronitrile | 2.1 |
| Methocel (1% solution) | 275 |
| 2-Anthraquinone sulfonate sodium salt | 0.1g |

The suspension polymerization was run at 72.5° – 73° C and 168–171 psi for about 4 hours. Three grams of butylated hydroxytoluene in 15g of toluene was then added. The reactor showed a small buildup of polymer scale from the previous run particularly above the liquid level.

EXAMPLE 5

Another suspension batch was formulated and was charged into the unwashed reactor used in Example 4:

| REAGENT | AMOUNT |
| --- | --- |
| Vinyl chloride monomer | 3095 |
| Water | 4225 |
| Azo bisisobutyronitrile | 2.1 |
| Methocel (1% solution) | 275 |
| 2-Anthraquinone sulfonic acid sodium salt | 0.1 |

The suspension polymerization was run at 72.8° – 73° C. and 156–170 psi for about 4¾ hours. A small increase in polymer build up compared to the previous run was noted.

EXAMPLE 6

A final suspension batch was formulated and was charged into the unwashed reactor used in Example 5:

| REAGENT | AMOUNT |
| --- | --- |
| Vinyl chloride monomer | 2780 |
| Water | 4225 |
| Azo bisisobutyronitrile | 2.1 |
| Methocel (1% solution) | 275 |
| 2-Anthraquinone sulfonic acid sodium salt | 0.1 |

The suspension polymerization was conducted at 70°–71° C. and a psi of 160 for about 5 hours. Three grams of butylated hydroxytoluene was added in 15g of toluene. The lower sides of the reactor below the water line and the bottom, except near the drain valve, were clean. A small amount of additional build up above the water line and near the drain valve was noted. Two to four additional runs without washing could have been performed.

What is claimed:

1. In the polymerization of an aqueous batch charge comprising a vinyl chloride monomer and an initiator in a reactor wherein the improvement comprises incorporating in said batch charge an amount of an anthraquinone sulfonate dye intermediate which is effective for reducing the polymer scale deposition on the walls of the reactor.

2. A process as claimed in claim 1 wherein the sulfonate is selected from the group consisting of 1-anthraquinone sulfonate, 2-anthraquinone sulfonate and 2,6-anthraquinone disulfonate.

3. A process as claimed in claim 2 wherein the sulfonate is selected from the group consisting of the sodium salts of 1-anthraquinone sulfonic acid, 2-anthraquinone sulfonic acid, and 2,6-anthraquinone disulfonic acid.

4. A process as claimed in claim 1 wherein the amount of sulfonate which is incorporated in the batch charge ranges from about 0.0005 to about 0.01% by weight of the batch charge.

5. A process as claimed in claim 1 wherein the amount of sulfonate which is incorporated in the batch charge ranges between about 0.001 and 0.002% by weight of the batch charge.

6. A process as claimed in claim 1 wherein the polymerization is conducted at a temperature of about 35° to 75° C.

7. A process as claimed in claim 1 wherein the aqueous batch charge also comprises an effective amount of a suspending agent.

8. A process as claimed in claim 7 wherein the suspending agent is present at about 0.05 to 5% of the weight of vinyl chloride monomer.

9. A process as claimed in claim 1 wherein the aqueous batch charge also comprises an effective amount of an emulsifying agent.

10. A process as claimed in claim 9 wherein the emulsifying agent is present at about 0.2 to 2% by weight of the vinyl chloride monomer.

* * * * *